(12) United States Patent
Kitaji (10) Patent No.: US 9,583,943 B2
(45) Date of Patent: Feb. 28, 2017

(54) POWER SUPPLY SYSTEM, POWER DISTRIBUTION APPARATUS, AND POWER CONTROL METHOD

(75) Inventor: Mitsuhiro Kitaji, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 547 days.

(21) Appl. No.: 14/235,068

(22) PCT Filed: Jul. 26, 2012

(86) PCT No.: PCT/JP2012/069004
§ 371 (c)(1),
(2), (4) Date: Jan. 26, 2014

(87) PCT Pub. No.: WO2013/015374
PCT Pub. Date: Jan. 31, 2013

(65) Prior Publication Data
US 2014/0152097 A1 Jun. 5, 2014

(30) Foreign Application Priority Data
Jul. 26, 2011 (JP) .................. 2011-163739

(51) Int. Cl.
*H02J 3/06* (2006.01)
*H02J 3/38* (2006.01)
(Continued)

(52) U.S. Cl.
CPC ........ *H02J 3/06* (2013.01); *H02J 1/10* (2013.01); *H02J 3/383* (2013.01); *H02J 3/387* (2013.01);
(Continued)

(58) Field of Classification Search
USPC ........................................... 307/19
See application file for complete search history.

(56) References Cited

U.S. PATENT DOCUMENTS

| 2011/0115295 A1 | 5/2011 | Moon et al. |
| 2012/0175955 A1* | 7/2012 | Carralero ............... H02J 3/381 307/38 |
| 2012/0299383 A1 | 11/2012 | Cyuzawa et al. |
| 2014/0049053 A1 | 2/2014 | Inoue |
| 2014/0062202 A1 | 3/2014 | Yamada et al. |

FOREIGN PATENT DOCUMENTS

| EP | 2325970 A2 | 5/2011 |
| EP | 2509183 A1 | 10/2012 |

(Continued)

OTHER PUBLICATIONS

The extended European search report issued by the European Patent Office on Mar. 17, 2015, which corresponds to European Patent Application No. 12817328.3-1804 and is related to U.S. Appl. No. 14/235,068.

(Continued)

*Primary Examiner* — Jared Fureman
*Assistant Examiner* — Dru Parries
(74) *Attorney, Agent, or Firm* — Procopio Cory Hargreaves and Savitch LLP (57) ABSTRACT

A power supply system comprises a path switching means that switches a power supply path between power generation equipment and a load so that at least a part of output power of each power generation equipment is supplied to another power generation equipment during a power failure or power instability in the grid.

11 Claims, 4 Drawing Sheets

(51) Int. Cl.
*H02J 1/10* (2006.01)
*H02J 7/35* (2006.01)
*H02J 9/06* (2006.01)

(52) U.S. Cl.
CPC .............. *H02J 7/35* (2013.01); *H02J 9/061* (2013.01); *Y02B 10/72* (2013.01); *Y02B 90/14* (2013.01); *Y02E 10/563* (2013.01); *Y02E 10/566* (2013.01); *Y10T 307/313* (2015.04)

(56) References Cited

FOREIGN PATENT DOCUMENTS

| | | |
|---|---|---|
| EP | 2670015 A1 | 12/2013 |
| EP | 2701264 A1 | 2/2014 |
| JP | 08-251827 A | 9/1996 |
| JP | 2002-209338 A | 7/2002 |
| JP | 2002-238164 A | 8/2002 |
| JP | 2005-102432 A | 4/2005 |
| JP | 2005-278337 A | 10/2005 |
| JP | 2008-022650 A | 1/2008 |
| WO | 2011/001796 A1 | 1/2011 |
| WO | 2011/065278 A1 | 6/2011 |

OTHER PUBLICATIONS

Communication pursuant to Rules 70(2) and 70a(2) EPC issued by the European Patent Office on Apr. 7, 2015, which corresponds to European Patent Application No. 12817328.3-1804 and is related to U.S. Appl. No. 14/235,068.
International Search Report; PCT/JP2012/069004; Aug. 28, 2012.

* cited by examiner

POWER SUPPLY SYSTEM, POWER DISTRIBUTION APPARATUS, AND POWER CONTROL METHOD

TECHNICAL FIELD

The present invention relates to a power supply system, and a power distribution apparatus, and a power control method for supplying power to a load by using a power generation equipment capable of being interconnected to a grid.

BACKGROUND ART

In recent years, a power generation equipment (for example, a photovoltaic cell and a fuel cell), as an auxiliary power supply for a power grid (hereinafter, "grid"), that can perform an interconnected operation in which power is supplied to a load by being interconnected to the grid is becoming widely used among power consumers.

In addition, a power generation equipment that can perform an independent operation in which power is supplied to a load without being interconnected to the grid (that is, independently of the grid), for example, during a power failure in the grid, is also known.

Furthermore, a power supply system in which power is supplied to a load by using both power generation equipment of a photovoltaic cell and a fuel cell has been proposed (see PTLs 1 and 2).

CITATION LIST

Patent Literature

PTL 1: Japanese Patent Application Publication No. H8-251827
PTL 2: Japanese Patent Application Publication No. 2005-278337

SUMMARY OF THE INVENTION

The first feature is summarized as follows. A power supply system that supplies power to a load by using a plurality of different power generation equipment capable of being interconnected to a grid, comprises: a path switching means that switches a power supply path between the plurality of power generation equipment and the load so that at least a part of output power of each power generation equipment is supplied to another power generation equipment during a power failure or power instability in the grid.

In the first feature, the power supply system further comprises: a off-line apparatus that performs off-line of the plurality of power generation equipment from the grid during a power failure or power instability in the grid.

In the first feature, the power supply system further comprises: a power supply apparatus that supplies power to the plurality of power generation equipment during a power failure or power instability in the grid, wherein the path switching means switches the power supply path within a period in which the power supply apparatus supplies power to the power generation equipment.

In the first feature, the plurality of power generation equipment include an islanding prevention function individually, and the power supply apparatus supplies, to the plurality of power generation equipment, power substantially equal to power supplied from the grid before a power failure or unstable power state occurs, in a parameter, which is a criterion for power failure determination by an active detection method in the islanding prevention function.

In the first feature, the off-line apparatus is provided on a power line between the grid and the power supply apparatus.

In the first feature, the power supply apparatus includes a storage battery, one of the plurality of power generation equipment is a fuel cell power generation equipment that performs a constant output operation at a rated output power, and the storage battery is charged with surplus power obtained by subtracting total power consumption of the load from the total output power of the plurality of power generation equipment.

In the first feature, the power supply system further comprises: a controller that controls the load, wherein the controller controls the load so that total power consumption amount of the load is smaller than total output power amount of the plurality of power generation equipment and when the total output power amount of the power generation equipment is smaller than the total power consumption amount of the load during a power failure or power instability in the grid.

In the first feature, the power supply system further comprises: a controller that controls the load, wherein the controller controls the load so that total power consumption amount of the load is smaller than total output power amount of the plurality of power generation equipment and when the total output power amount of the power generation equipment is smaller than the total power consumption amount of the load during a power failure or power instability in the grid.

In the first feature, the power supply apparatus includes a storage battery, when the total output power of the plurality of power generation equipment is larger than the total power consumption of the load, the controller controls to charge the storage battery with surplus power obtained by subtracting the total power consumption from the total output power.

In the first feature, the plurality of power generation equipment include a first power generation equipment and a second power generation equipment, the plurality of power generation equipment further include a first power line connected to the first power generation equipment and a second power line connected to the second power generation equipment, the path switching means includes: a third power line connected to the first power line; and a switch that is provided on the second power line and switches the second power line to be connected or not connected to the third power line, and the switch switches the power supply path so that at least apart of output power of each power generation equipment is supplied to another power generation equipment by connecting the second power line to the third power line during a power failure or power instability in the grid.

The second feature is summarized as follows. A power distribution apparatus that supplies power to a load by using a plurality of different power generation equipment capable of being interconnected to a grid, comprises: a path switching means that switches a power supply path between the plurality of power generation equipment and the load so that at least a part of output power of each power generation equipment is supplied to another power generation equipment during a power failure or power instability in the grid.

The second feature is summarized as follows. A power control method in a power supply system that supplies power to a load by using a plurality of different power generation equipment capable of being interconnected to a grid, comprises: a step of switching a power supply path between the power generation equipment and the load so that at least a part of output power of each power generation equipment is supplied to another power generation equipment during a power failure or power instability in the grid.

DESCRIPTION OF THE EMBODIMENT

With reference to the drawings, the embodiment of the power supply system of the present invention will be described. In the drawings of the following embodiments, the same or similar reference numerals are applied to the same or similar portions.

Figure 1:
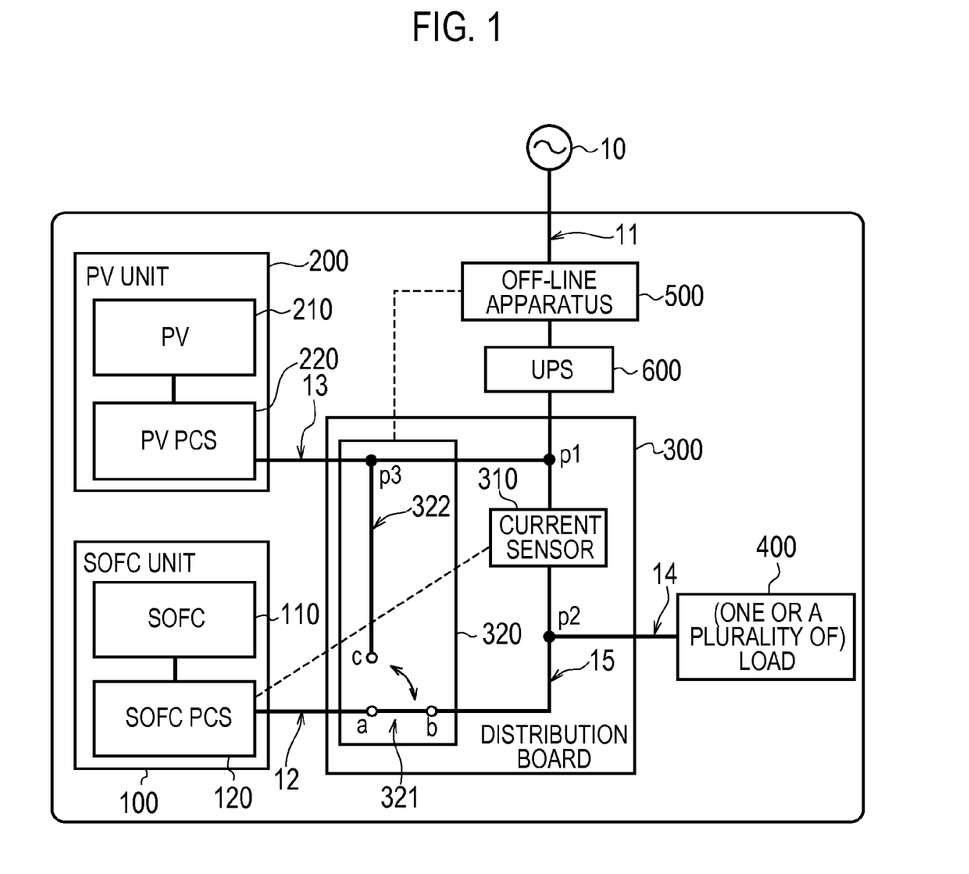
FIG. 1 is a block diagram of a power supply system according to the embodiment of the present invention.

FIG. 1 is a block diagram of a power supply system according to the present embodiment. In the following block diagrams, a thick line represents a power line and a dashed line represents a communication line. It is noted that the communication line may be wireless.

As shown in FIG. 1, the power supply system according to the present embodiment includes a solid oxide fuel cell (SOFC) unit 100, a photovoltaic cell (PV) unit 200, a distribution board 300, one or a plurality of loads 400, a off-line apparatus 500, and an uninterruptible power supply (UPS) 600.

The SOFC unit 100, PV unit 200, distribution board 300, load 400, off-line apparatus 500, and UPS 600 are provided in a consumer that receives supply of alternating-current power (AC power) from a grid 10 of an electric power company. In the present embodiment, the SOFC unit 100 and PV unit 200 correspond to a plurality of different power generation equipment capable of being interconnected to the grid 10.

The SOFC unit 100 includes an SOFC 110 and an SOFC power conditioner (SOFC PCS) 120.

The SOFC 110, which is a kind of fuel cell, generates power by a chemical reaction between hydrogen obtained from natural gas or the like and oxygen in the air and output the generated direct-current power (DC power). It is noted that a configuration (so-called cogeneration grid) in which hot water is generated by heat exchange with heat generated during the chemical reaction and the hot water is stored in a hot water storage tank may be adapted. The amount of power generated by the SOFC 110 varies depending on the amounts of the gas and the air input to the SOFC 110. The amounts of the gas and the air are controlled by the SOFC PCS 120.

DC power output from the SOFC 110 is input to the SOFC PCS 120. The SOFC PCS 120 converts the input DC power into AC power and outputs the AC power through an SOFC power line 12. In the present embodiment, the output power is controlled to be increased and decreased by the SOFC PCS 120 on the basis of a current value measured by a current sensor 310 provided on the distribution board 300, so that the output power of the SOFC unit 100 does not reversely flow.

The SOFC PCS 120 has the above-described islanding prevention function. In particular, the SOFC PCS 120 monitors the power state (such as a current, voltage, phase, and frequency) of the SOFC power line 12 during the interconnected operation and determines whether a power failure or unstable power state occurs in the grid 10 on the basis of the power state (the determination of a power failure is substantially same as an active detection method in the islanding prevention function to be described later). A part of the AC power from the grid 10 is supplied to the SOFC power line 12, and thus, the SOFC PCS 120 can determine whether a power failure or unstable power state occurs in the grid 10 by monitoring the SOFC power line 12. The SOFC PCS 120 stops the operation when determining that a power failure or unstable power state occurs in the grid 10.

The PV unit 200 includes a PV 210 and a PV PCS 220.

The PV 210 receives sunlight to generate electricity, and outputs the generated DC power. The amount of power generated by the PV 210 varies depending on the amount of the sunlight irradiated onto the PV 210.

DC power output from the PV 210 is input to the PV PCS 220. The PV PCS 220 converts the input DC power into AC power and outputs the AC power through a PV power line 13. Similarly to the SOFC PCS 120 of the SOFC unit 100, the PV PCS 220 has the islanding prevention function. In particular, by monitoring the power state of the PV power line 13, the PV PCS 220 stops the operation when determining that a power failure or unstable power state occurs in the grid 10.

A grid power line 11, the SOFC power line 12, the PV power line 13, a load power line 14 are connected to the distribution board 300. The distribution board 300 distributes output AC power from the SOFC unit 100 and output AC power from the PV unit 200 to the grid 10 and the load 400, and distributes output AC power from the grid 10 to the plurality of loads 400. The configuration of the distribution board 300 will be described later.

The load power line 14 is connected to the load 400. AC power is input to the load 400 through the load power line 14. The load 400 operates by consuming the input AC power. The load 400 may not just be a household electrical appliance such as lighting, an air conditioner, a refrigerator, or a television, but may also be a heat accumulator and the like.

On the grid power line 11, the off-line apparatus 500 is provided between the grid 10 and the UPS 600. The off-line apparatus 500 performs off-line of the SOFC unit 100 and the PV unit 200 from the grid 10 during a power failure or power instability in the grid 10. The configuration of the off-line apparatus 500 will be described later.

On the grid power line 11, the UPS 600 is provided between the off-line apparatus 500 and the distribution board 300. The UPS 600 supplies power through the grid power line 11 when the power failure or the power instability occurs in the grid 10. The configuration of the UPS 600 will be described later.

Next, a configuration of the distribution board 300 is explained. As shown in FIG. 1, the distribution board 300 includes a part of the grid power line 11, a part of the SOFC power line 12, a part of the PV power line 13, apart of the load power line 14, an intermediate power line 15, the current sensor 310, and a path switching unit 320.

One end of the intermediate power line 15 is connected to a connection point p1 between the PV power line 13 and the grid power line 11, and the other end thereof is connected to the path switching unit 320. The load power line 14 is connected to the intermediate power line 15 at a connection point p2.

The current sensor 310 is provided on the intermediate power line 15. The current sensor 310 measures current flowing through the intermediate power line 15. The current sensor 310 outputs the result of the measurement through a communication line provided between the current sensor 310 and the SOFC PCS 120.

The path switching unit 320 includes a path changeover switch 321 and an SOFC/PV cooperation line 322. Further, the path switching unit 320 includes a communication line between the off-line apparatus 500 and itself. One end of the SOFC/PV cooperation line 322 is connected to an output terminal c of the path changeover switch 321, and the other end thereof is connected to the PV power line 13 at a connection point p3.

An input terminal a of the path changeover switch 321 is connected to the SOFC power line 12, an output terminal b thereof is connected to the intermediate power line 15, and the output terminal c thereof is connected to the SOFC/PV cooperation line 322. The path changeover switch 321 is normally maintained at an output terminal b side to connect the SOFC power line 12 to the intermediate power line 15. In contrast, during a power failure or power instability in the grid 10, the path changeover switch 321 is switched to an output terminal c side to connect the SOFC power line 12 to the SOFC/PV cooperation line 322 on the basis of a notice that is input from the off-line apparatus 500 through the communication line.

In the distribution board 300 having such a configuration, a power supply path from the PV unit 200 to the load 400 is configured by the PV power line 13, the intermediate power line 15, and the load power line 14.

A power supply path from the SOFC unit 100 to the load 400 is normally configured by the SOFC power line 12, the path changeover switch 321, the intermediate power line 15, and the load power line 14.

In contrast, during a power failure or power instability in the grid 10, the power supply path from the SOFC unit 100 to the load 400 is configured by the SOFC power line 12, the path changeover switch 321, the SOFC/PV cooperation line 322, the PV power line 13, the intermediate power line 15, and the load power line 14. As a result, during a power failure or power instability in the grid 10, a part of the output power of the SOFC unit 100 is supplied to the PV unit 200 and a part of the output power of the PV unit 200 is supplied to the SOFC unit 100. The SOFC unit 100 and the PV unit 200 supply a part of the output power to each another.

Figure 2:
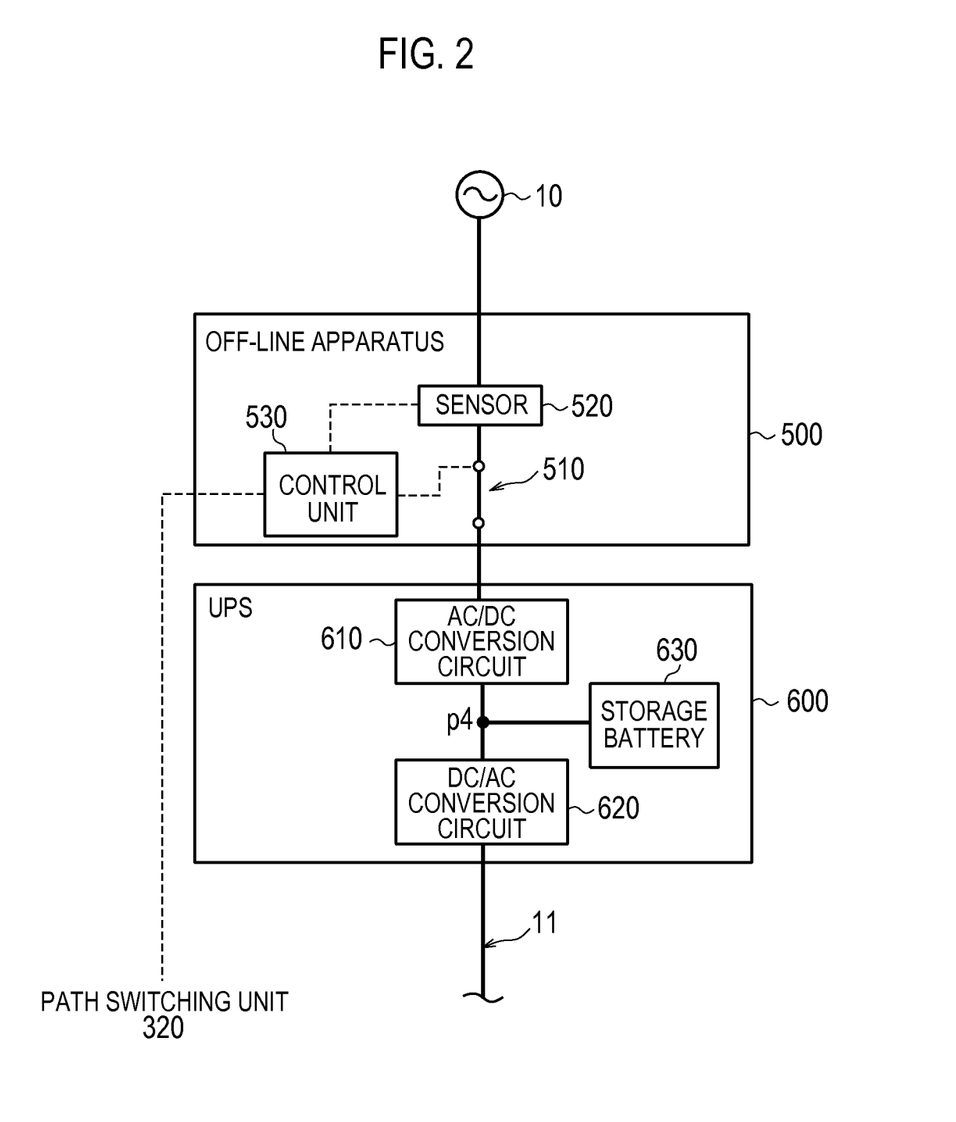
FIG. 2 is a block diagram of the off-line apparatus 500 and the UPS according to the embodiment of the present invention.

Next, a configuration of the off-line apparatus 500 is explained. FIG. 2 is a block diagram of the off-line apparatus 500 and the UPS 600.

As shown in FIG. 2, the off-line apparatus 500 includes a switch 510, a sensor 520, and a control unit 530.

The switch 510 is provided on the grid power line 11. The switch 510 is controlled by the control unit 530, and connects or disconnects the grid power line 11.

The sensor 520 is provided on the grid power line 11. The sensor 520 measures the power state (such as a current, voltage, phase, and frequency) of the grid power line 11, and outputs the result of the measurement to the control unit 530.

The control unit 530 determines whether a power failure or unstable power state occurs in the grid 10 on the basis of the result of the measurement by the sensor 520. The control unit 530 controls the switch 510 to disconnect the grid power line 11 when determining that a power failure or unstable power state occurs in the grid 10. As a result, the SOFC unit 100 and the PV unit 200 are off-lined from the grid 10. Further, the control unit 530 outputs a notice to the path switching unit 320 through a communication line between the path switching unit 320 and itself when determining that a power failure or unstable power state occurs in the grid 10.

Next, a configuration of the UPS 600 is explained.

As shown in FIG. 2, the UPS 600 includes an AC/DC conversion circuit 610, a DC/AC conversion circuit 620, and a storage battery 630.

The AC/DC conversion circuit 610 is provided on the grid power line 11. The AC/DC conversion circuit 610 converts AC power from the grid 10 into DC power and outputs the DC power to the DC/AC conversion circuit 620. When reverse power flow occurs, the AC/DC conversion circuit 610 converts DC power from the DC/AC conversion circuit 620 into AC power and outputs the AC power to the off-line apparatus 500.

The DC/AC conversion circuit 620 is provided on the grid power line 11. The DC/AC conversion circuit 620 converts DC power from the AC/DC conversion circuit 610 into AC power and outputs the AC power to the distribution board 300. When reverse power flow occurs, the DC/AC conversion circuit 620 converts AC power from the distribution board 300 into DC power and outputs the DC power to the AC/DC conversion circuit 610.

The storage battery 630 is connected to a connection point p4 between the AC/DC conversion circuit 610 and the DC/AC conversion circuit 620. The storage battery 630 is charged with DC power at the connection point p4. During a power failure or power instability in the grid 10, the storage battery 630 discharges the charged DC power. The DC/AC conversion circuit 620 converts the DC power discharged by the storage battery 630 into AC power and outputs the AC power. As a result, stable power supply is performed until the storage battery 630 is exhausted, even during a power failure or power instability in the grid 10.

Next, an operation of the power supply system according to the present embodiment will be described.

Figure 3:
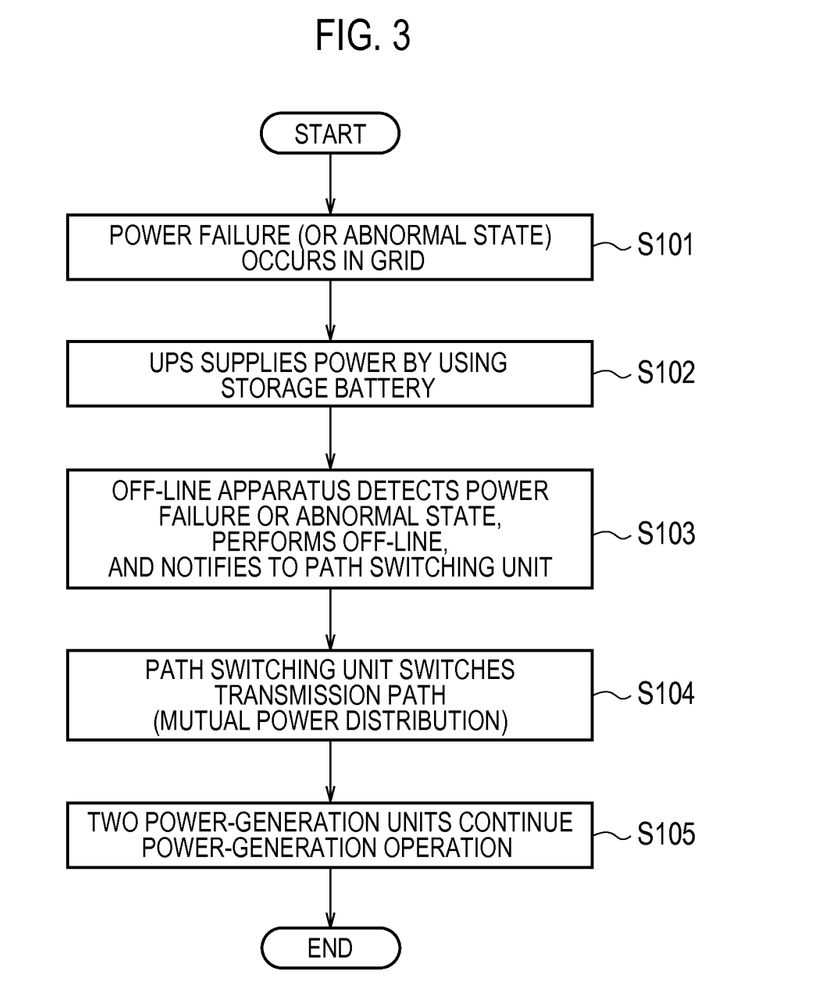
FIG. 3 is an operation flow diagram of the power supply system according to the embodiment of the present invention.

FIG. 3 is an operation flow diagram of the power supply system according to the present embodiment. Hereinafter, a description will be given of an operation in a case where a power failure or unstable power state occurs in the grid 10 during operations of both power-generation units of the SOFC unit 100 and the PV unit 200.

First, the islanding prevention function will be described.

For example, in Japan, it is required that a power generation equipment that can perform an interconnected operation avoids a state (islanding) in which the output power of the power generation equipment can reversely flow when a power failure occurs in a grid, for ensuring safety, workability on an electric power company side and the like. Therefore, it is required that the power generation equipment that can perform an interconnected operation has a function (islanding prevention function) to stop the operation by detecting a power failure or a sign thereof. Thus, it should be noted that when a power failure or unstable power state occurs in the grid 10 during the operations of both power-generation units of the SOFC unit 100 and the PV unit 200, both power-generation units stop the operations by the above-described islanding prevention functions which are individually included therein.

As shown in FIG. 3, in step S101, a power failure or unstable power state occurs in the grid 10.

In step 102, the UPS 600 is activated to supply power at the timing when the power failure or unstable power state occurs in the grid 10. In particular, in the UPS 600, the storage battery 630 discharges the charged DC power, and the DC/AC conversion circuit 620 converts the DC power discharged by the storage battery 630 into AC power and outputs the AC power to the distribution board 300 through the grid power line 11. In the distribution board 300, a part of the output power of the UPS 600 is supplied to the PV PCS 220 through the PV power line 13. In particular, the power supplied in this case is made to be substantially equal in parameters, which are criteria for determination by an active detection method in the islanding prevention function, such as a current, voltage, phase, and frequency from the grid 10 before the power failure or unstable power state occurs. Therefore, the PV PCS 220 does not recognize the power failure or unstable power state of the grid 10 because of the power supply from the UPS 600, and thus, the islanding prevention function is not activated.

In addition, a part of the output power of the UPS 600 is supplied to the SOFC PCS 120 through the grid power line 11, the intermediate power line 15, the path changeover switch 321 and the SOFC power line 12. Therefore, the SOFC PCS 120 does not recognize the power failure or unstable power state of the grid 10 because of the power supply from the UPS 600, and thus, the islanding prevention function is not activated.

In step S103, the off-line apparatus 500 provided closer to a grid 10 side than the UPS 600 recognizes the power failure or unstable power state of the grid 10 and performs off-line of the SOFC unit 100 and PV unit 200 from the grid 10. In particular, in the off-line apparatus 500, the control unit 530 controls the switch 510 to disconnect the grid power line 11 when determining that a power failure or unstable power state occurs in the grid 10. In addition, the control unit 530 outputs a notice to the path switching unit 320 through the communication line with the path switching unit 320.

As described above, in step S104, the path switching unit 320 switches the power supply path in response to the notice from the off-line apparatus 500.

As a result, the output power of the SOFC PCS 120 is supplied to the PV PCS 220 through the SOFC power line 12, the path changeover switch 321, the SOFC/PV cooperation line 322, and the PV power line 13. Therefore, the PV PCS 220 does not recognize the power failure or unstable power state of the grid 10 because of the power supply from the SOFC PCS 120 even when the power supply from the UPS 600 is stopped, and thus, the islanding prevention function is not activated.

Further, the output power of the PV PCS 220 is supplied to the SOFC PCS 120 through the PV power line 13, the SOFC/PV cooperation line 322, the path changeover switch 321, and the SOFC power line 12. Therefore, the SOFC PCS 120 does not recognize the power failure or unstable power state of the grid 10 because of the power supply from the PV PCS 220 even when the power supply from the UPS 600 is stopped, and thus, the islanding prevention function is not activated.

In step S105, both power-generation units of the SOFC unit 100 and the PV unit 200 continue the operations without activating the islanding prevention functions.

As described above, during a power failure or power instability in the grid 10, the path switching unit 320 switches the power supply path so that the output power of the SOFC unit 100 is supplied to the PV unit 200 and the output power of the PV unit 200 is supplied to the SOFC unit 100. Thus, each of the SOFC unit 100 and PV unit 200 does not recognize a power failure or unstable power state of the grid 10 because of power supply from the other power-generation unit. As a result, the islanding prevention function of each power-generation unit is not activated, and thus, the operation can be continued.

In addition, in the present embodiment, the UPS 600 supplies power during a power failure or power instability in the grid 10, and thus, even when it takes time to switch the power supply path by the path switching unit 320, it is possible to secure time to perform the switching by performing the switching within a period in which the UPS 600 is operative.

Furthermore, in the present embodiment, during a power failure or power instability in the grid 10, the off-line apparatus 500 performs off-line of the SOFC unit 100 and PV unit 200 from the grid 10. As a result, when the power failure or power instability occurs in the grid 10 and even when the SOFC unit 100 and PV unit 200 continue the operations, an islanding can be prevented.

FIRST MODIFICATION

In the above-described first embodiment, the SOFC unit 100 generates power with an amount of power generated corresponding to the total power consumption amount of the load 400 on the basis of the current value measured by the current sensor 310 so that reverse power flow does not occur.

In the present modification, during a power failure or power instability in the grid 10, the SOFC unit 100 performs a constant output operation at a rated output power. In this case, although a surplus (surplus power) of the total output power of the SOFC unit 100 and PV unit 200 may be generated with respect to the total power consumption of the load 400, the surplus power can be charged into the storage battery 630 of the UPS 600.

Thus, it is possible to more reliably cover the power consumption of the load 400 by performing a constant output operation of the SOFC unit 100 at a rated output power, even when the total power consumption of the load 400 varies. Further, by charging the storage battery 630 with the surplus power obtained by subtracting the total power consumption of the load 400 from the total output power of the SOFC unit 100 and PV unit 200, it is possible to utilize the power obtained by power generation without waste.

In other words, even if the load following capability of the SOFC unit 100 is low, it is possible to increase the output power of the SOFC unit 100 to the rated power by charging the storage battery 630 with the surplus power. Accordingly, it is possible to improve the power generation efficiency of the SOFC unit 100 and also suppress the deterioration of the load following capability of the SOFC unit 100.

SECOND MODIFICATION

Figure 4:
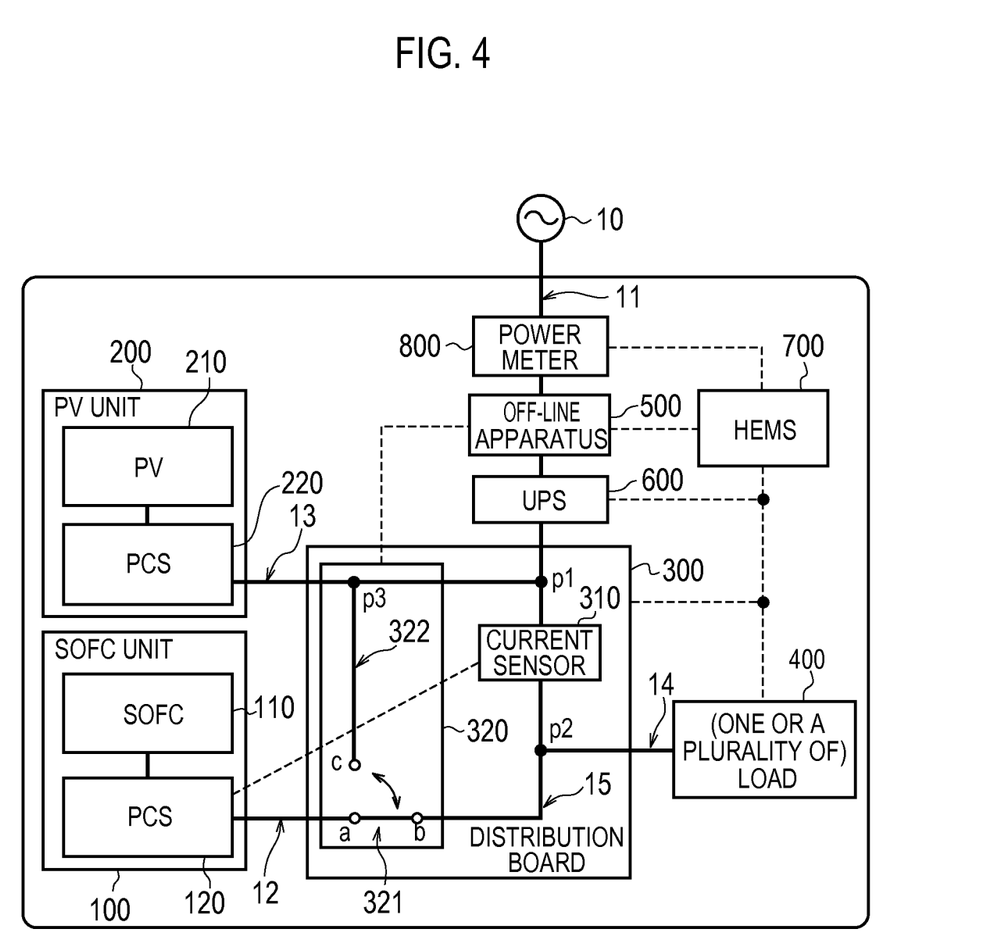
FIG. 4 is a block diagram of the power supply system according to the second modification of the embodiment of the present invention.

FIG. 4 is a block diagram of the power supply system according to the present modification.

As shown in FIG. 4, the power supply system according to the present modification includes a HEMS (Home Energy Management Grid) 700 for managing power in a consumer. The HEMS 700 manages and displays the power consumption amount of the load 400, and performs control of the load 400 for power saving. The HEMS 700 includes a communication line between itself and each of a power meter 800, a communication line with the UPS 600, on the grid power line 11, and the load 400. The HEMS 700 corresponds to a controller that controls the load 400.

When (or immediately before) performing off-line by the off-line apparatus 500, and if there is a power purchase from the grid 10 (that is, the total power consumption amount of the load 400>the total output power amount of the SOFC unit 100 and PV unit 200), the HEMS 700 confirms the remaining power amount of the storage battery 630 of the UPS 600 and reduces the total power consumption amount of the load 400 so as to satisfy the total power consumption amount of the load 400≤the total output power amount of the SOFC unit 100 and PV unit 200 by the time a remaining amount of the storage battery is exhausted.

According to the present modification, it is possible to more reliably cover the total power consumption of the load 400 by the total output power amount of the SOFC unit 100 and PV unit 200, during a power failure or power instability in the grid 10.

Other Embodiment

As described above, the present invention has been described according to the embodiment. It must not be understood that, however, the discussions and the drawings constituting a part of this disclosure limit the present invention. From this disclosure, various alternative embodiments, examples and operational techniques are apparent to those skilled in the art.

In the above-described embodiments, the cases where the SOFC unit 100 and PV unit 200 are combined as the plurality of different power-generation units (power generation equipment) are illustrated, however the combination is not limited thereto. That is, the combination may include a wind power-generation unit or a storage battery unit. Further, the power supply system may include at least two different power-generation units, and the present invention may be applied to a power supply system including three or more power-generation units.

As described above, it must be understood that the present invention includes various embodiments and the like that are not described herein.

In the embodiments, the path switching unit 320 is provided on the distribution board 300, however the embodiment is not limited thereto. Specifically, the path switching unit 320 may be provided in the SOFC PCS 120 of the SOFC unit 100 or the PV PCS 220 of the PV unit 200.

Note that the entire content of the Japanese Patent Application No. 2011-163739 (filed on Jul. 26, 2011) is incorporated herein by reference.

INDUSTRIAL APPLICABILITY

The present invention can provide the power supply system, power distribution apparatus and the power control method, with which the operation of the power generation equipment can be continued without being stopped even when a power failure or unstable power state occurs in the grid.

The invention claimed is:

1. A power supply system that supplies power to a load by using a plurality of power generation equipments different from each other and each of the plurality of power generation equipments capable of being interconnected to a grid, comprising:
a path switch configured to, during a power failure or power instability in the grid, switch a power supply path between the plurality of power generation equipments and the load, so that output power of a first power generation equipment among the plurality of power generation equipments is supplied to a second power generation equipment among the plurality of power generation equipments via a link power line different from a grid power line,
wherein the grid power line is a power line connected to the grid, a first power line, a second power line, and a third power line, the first power line being a power line connected to the first power generation equipment, the second power line being a power line connected to the second power generation equipment, the third power line being a power line extended from the load, and
wherein the path switch is configured to connect the first power line and the second power line by the link power line during the power failure or power instability in the grid, otherwise the path switch is configured to connect the second power line and the third power line.

2. The power supply system according to claim 1, further comprising:
an off-line apparatus that performs off-line of the plurality of power generation equipments from the grid during the power failure or power instability in the grid.

3. The power supply system according to claim 2, further comprising:
a power supply apparatus that supplies power to the plurality of power generation equipments during the power failure or power instability in the grid,
wherein the path switch switches the power supply path within a period in which the power supply apparatus supplies power to the power generation equipments.

4. The power supply system according to claim 3, wherein each of the plurality of power generation equipments include an islanding prevention function, and the power supply apparatus supplies, to the plurality of power generation equipments, power substantially equal to power supplied from the grid before a power failure or unstable power state occurs, in a parameter, which is a criterion for power failure determination by an active detection method in the islanding prevention function.

5. The power supply system according to claim 3, wherein the off-line apparatus is provided on a power line between the grid and the power supply apparatus.

6. The power supply system according to claim 3, wherein the power supply apparatus includes a storage battery, one of the plurality of power generation equipments is a fuel cell power generation equipment that performs a constant output operation at a rated output power, and the storage battery is charged with surplus power obtained by subtracting total power consumption of the load from a total output power of the plurality of power generation equipment.

7. The power supply system according to claim 3, further comprising a controller that controls the load, wherein, when a total output power amount of the plurality of power generation equipments is smaller than a total power consumption amount of the load during the power failure or power instability in the grid, the controller controls the load so that the total power consumption amount of the load is smaller than the total output power amount of the plurality of power generation equipments.

8. The power supply system according to claim 7, wherein the power supply apparatus includes a storage battery, the controller controls the load so that the total power consumption amount of the load is smaller than the total output power amount by the time a remaining amount of the storage battery is exhausted.

9. The power supply system according to claim 7, wherein the power supply apparatus includes a storage battery, when the total output power of the plurality of power generation equipments is larger than the total power consumption of the load, the controller controls to charge the storage battery with surplus power obtained by subtracting the total power consumption from the total output power.

10. A power distribution apparatus that supplies power to a load by using a plurality of power generation equipments different from each other and each of the plurality of power generation equipments capable of being interconnected to a grid, comprising:
- a path switch configured to, during a power failure or power instability in the grid, switch a power supply path between the plurality of power generation equipments and the load, so that output power of a first power generation equipment among the plurality of power generation equipments is supplied to a second power generation equipment among the plurality of power generation equipments via a link power line different from a grid power line,
- wherein the grid power line is a power line connected to the grid, a first power line, a second power line, and a third power line, the first power line being a power line connected to the first power generation equipment, the second power line being a power line connected to the second power generation equipment, the third power line being a power line extended from the load, and
- wherein the path switch is configured to connect the first power line and the second power line by the link power line during the power failure or power instability in the grid, otherwise the path switch is configured to connect the second power line and the third power line.

11. A power control method in a power supply system that supplies power to a load by using a plurality of power generation equipments different from each other and each of the plurality of power generation equipments capable of being interconnected to a grid, comprising a step of:
- (a) during a power failure or power instability in the grid, switching a power supply path between the power generation equipments and the load, so that output power of a first power generation equipment among the plurality of power generation equipments is supplied to a second power generation equipment among the plurality of power generation equipments via a link power line different from a grid power line,
- wherein the grid power line is a power line connected to the grid, a first power line, a second power line, and a third power line, the first power line being a power line connected to the first power generation equipment, the second power line being a power line connected to the second power generation equipment, the third power line being a power line extended from the load, and
- wherein the step (a) includes a step of connecting the first power line and the second power line by the link power line during the power failure or power instability in the grid; and (b) when the grid is providing stable power, connecting the second power line and the third power line.

* * * * *